United States Patent
Sarabia

(10) Patent No.: US 6,883,947 B1
(45) Date of Patent: Apr. 26, 2005

(54) AUTOMOTIVE LASER ILLUMINATION MODULE AND SYSTEM

(76) Inventor: Maribel Sarabia, 6116 Passons Blvd., Pico Rivera, CA (US) 90660

( * ) Notice: Subject to any disclaimer, the term of this patent is extended or adjusted under 35 U.S.C. 154(b) by 0 days.

(21) Appl. No.: 10/408,829

(22) Filed: Apr. 7, 2003

(51) Int. Cl.[7] .............................. B60Q 1/26; F21V 17/02
(52) U.S. Cl. ....................... 362/540; 362/259; 362/513
(58) Field of Search .................................. 362/259, 282, 362/284, 322, 324, 512, 513, 514, 538, 540, 362/541, 543, 545; 340/471, 479

(56) References Cited

U.S. PATENT DOCUMENTS

| | | | |
|---|---|---|---|
| 3,435,200 A | * 3/1969 | Massoll et al. ............. | 362/513 |
| 3,840,731 A | 10/1974 | Saufferer ..................... | 240/9.5 |
| 4,670,637 A | 6/1987 | Morrison et al. ........... | 219/121 |
| 5,758,958 A | 6/1998 | Chen .......................... | 362/307 |
| 5,791,757 A | 8/1998 | O'Neil et al. ................ | 362/32 |
| 6,064,330 A | 5/2000 | Elliott et al. ................. | 342/54 |
| 6,422,728 B1 | * 7/2002 | Riggin ........................ | 362/259 |
| 6,543,917 B1 | * 4/2003 | Berlinghof ................... | 362/540 |
| 6,685,347 B2 | * 2/2004 | Grutze ......................... | 362/514 |
| 2003/0107900 A1 | * 6/2003 | Ellison ........................ | 362/540 |

* cited by examiner

Primary Examiner—Y. My Quach-Lee
(74) Attorney, Agent, or Firm—Goldstein Law Offices, PC.

(57) ABSTRACT

A laser illumination system, for use with an automobile, comprising a plurality of modules. Each module has a housing having a lens, and a mode selection switch for choosing between headlight and taillight modes. Preferably, two modules are mounted at the front of the automobile to function as headlights, and two of the modules are mounted at the rear of the automobile to function as taillights. Each module has a beam emitter which produces an initial beam of laser light and an output mirror which directs an exit beam through the lens, outwardly of the automobile, and ultimately creates a cone of light at the ground surface forwardly or rearwardly of the automobile. When used as a headlight and the mode selection switch is appropriately set, an output mirror rotation motor spreads the output beam so that it creates a larger cone on the ground surface.

17 Claims, 7 Drawing Sheets

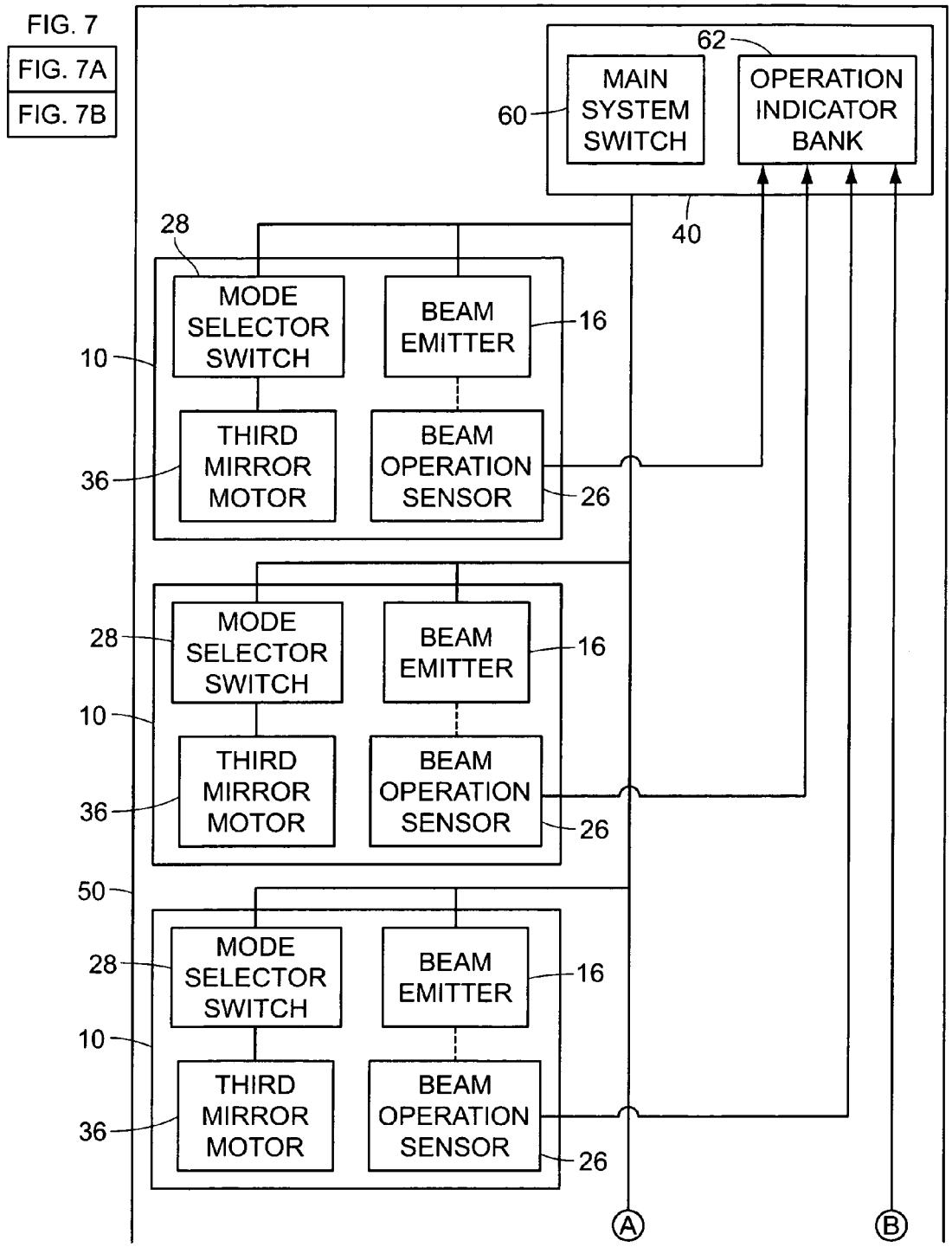

AUTOMOTIVE LASER ILLUMINATION MODULE AND SYSTEM

BACKGROUND OF THE INVENTION

The invention relates to an automotive laser illumination module and system. More particularly, the invention relates to an illumination module which is used to provide illumination external to an automobile for enhancing the visibility of the automobile to others, and a system for providing and controlling multiple illumination modules within the automobile.

Automotive headlights serve two important purposes. First they help illuminate objects in front of the vehicle, so that the driver can best see and avoid any obstacles. In addition, they enhance the visibility of the vehicle, so that others can recognize that a vehicle is approaching, how quickly, and the trajectory upon which it is traveling.

The second purpose for the headlights is actually more important. When traveling at highway speeds, the distance which can be adequately illuminated by the headlights is often considerably less than that distance within which the driver could stop the vehicle if a hazard is seen thereby. Accordingly, the importance of making the vehicle visible to other vehicles and pedestrians cannot be discounted.

At times, however, conventional, halogen, and even xenon headlights are not successful in warning others of its presence, and its approach. Generally during inclement weather, the light emanating from the headlights may become so dispersed by precipitation or fog that they are only visible a short distance in front of the vehicle. In addition, in certain conditions the headlights even make it more difficult to see. In fog and snowy conditions in particular, the headlights brightly illuminate the fog and snow immediately in front of the vehicle—yet obscure other vehicles, pedestrians, and road hazards. For this reason, it should be clear why weather is a major factor in automobile accidents.

One attempted solution is to provide additional 'fog lights'. These lights are often provided as 'after-market' accessories. Unfortunately, under severe weather conditions many of these lights decrease visibility for the driver. For example, U.S. Pat. No. 5,758,958 to Chen discloses a fog signal light. U.S. Pat. No. 3,840,731 to Saufferer discloses a fog light which seeks to provide improved operation during foggy conditions by radiating polarized light.

Accordingly, what is desired is a system that will enhance the visibility of the vehicle, especially in conditions of fog by employing the qualities of LASER (Light Amplification by Stimulated Emission of Radiation) light in an automotive application such that the visibility of the automobile is greatly increased. U.S. Pat. No. 6,064,330 to Elliot et al. illustrates how laser range signals in combination with radar signals can be used to accurately measure a target range through fog. U.S. Pat. No. 4,670,637 to Morrison et al. discloses how a laser can be tuned to resonant frequency of water droplets to allow a modulated laser signal to be effectively transmitted through fog.

U.S. Pat. No. 5,791,757 to O'Neil et al. discloses a vehicle lighting system which seeks to minimize headlight and taillight space by eliminating the 'bulb and reflector' combination to allow "greater vehicle design flexibility" by providing a centralized laser emitter, carrying the emitted light to the extremities of the vehicle using fiber optics, and then dispersing the light with a plurality of micro-optical wedges.

While these units may be suitable for the particular purpose employed, or for general use, they would not be as suitable for the purposes of the present invention as disclosed hereafter.

SUMMARY OF THE INVENTION

It is an object of the invention to produce an automotive laser illumination module that is effective at enhancing the visibility of a vehicle. Accordingly, the module creates, controls, and directs a beam of laser light from the vehicle such that it is more easily seen than conventional automotive lights, especially during times of decreased atmospheric visibility.

It is another object of the invention to enhance manufacturing efficiency by providing an automotive laser illumination module that can be used as a headlight or taillight. Accordingly, the module is switchable between headlight and taillight modes.

It is a further object of the invention that when the module is functioning as a headlight, the beam is dispersed into a wider pattern. Accordingly, when in the headlight mode, the beam is affected by a dispersion mechanism that may include a rotating mirror that is actuated only when in the headlight mode, to provide a wider dispersion pattern for the beam as it exits the module.

It is a still further object of the invention to provide an automotive laser illumination system which employs multiple illumination modules and which provides the driver with feedback regarding which modules among a typical configuration of four modules per vehicles, are properly functioning. Accordingly, a dashboard mounted status panel is provided, each module has a sensor for determining when the beam is operating, and the dashboard mounted status panel indicates the presence of an operating beam in each of the modules.

The invention is a laser illumination system, for use with an automobile, comprising a plurality of modules. Each module has a housing having a lens, and a mode selection switch for choosing between headlight and taillight modes. Preferably, two modules are mounted at the front of the automobile to function as headlights, and two of the modules are mounted at the rear of the automobile to function as taillights. Each module has a beam emitter which produces an initial beam of laser light and an output mirror which directs an exit beam through the lens, outwardly of the automobile, and ultimately creates a cone of light at the ground surface forwardly or rearwardly of the automobile. When used as a headlight and the mode selection switch is appropriately set, an output mirror rotation motor spreads the output beam so that it creates a larger cone on the ground surface.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
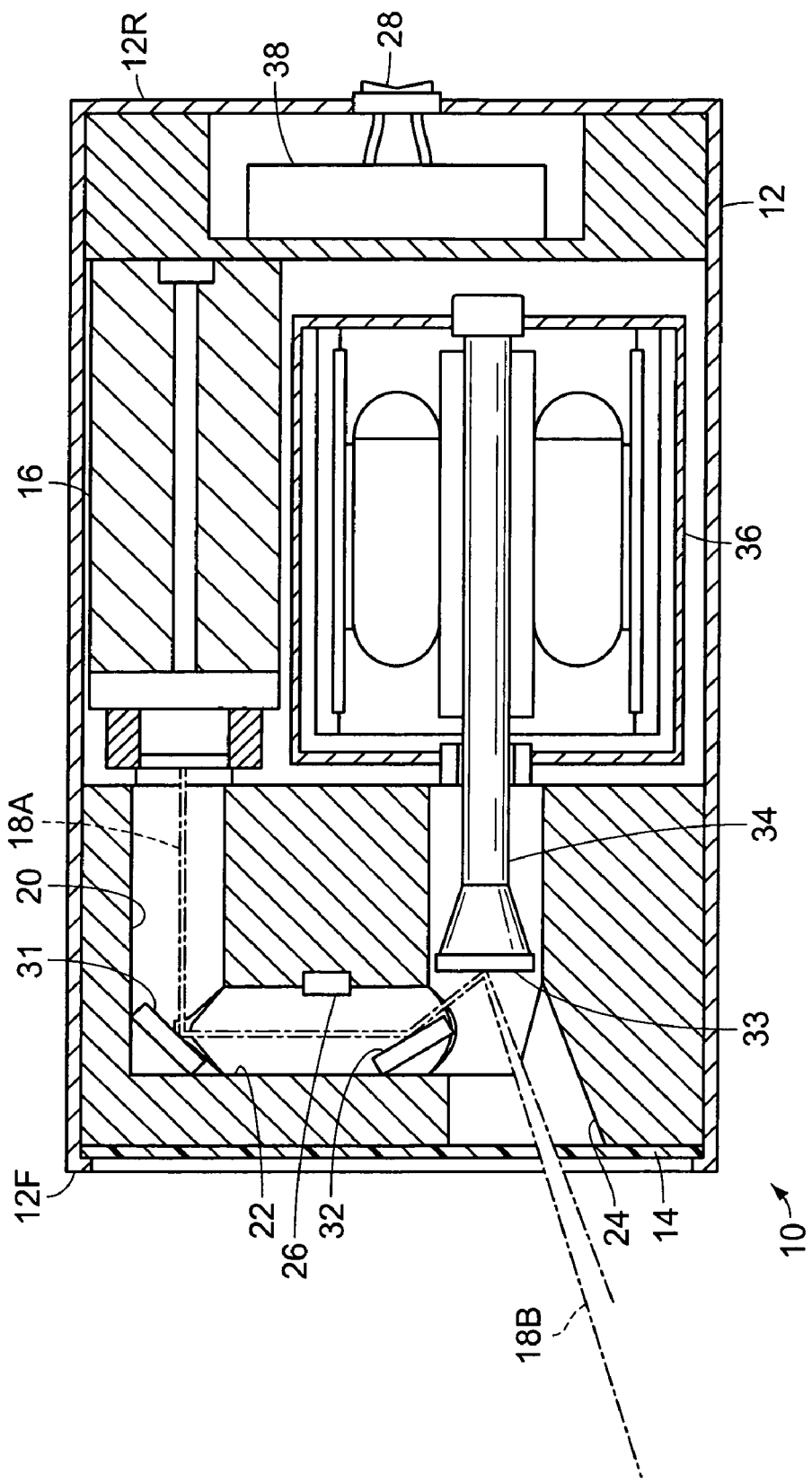
FIG. 1 is a cross sectional view, with parts broken away, illustrating just the laser module according to the present invention.
Figure 2:
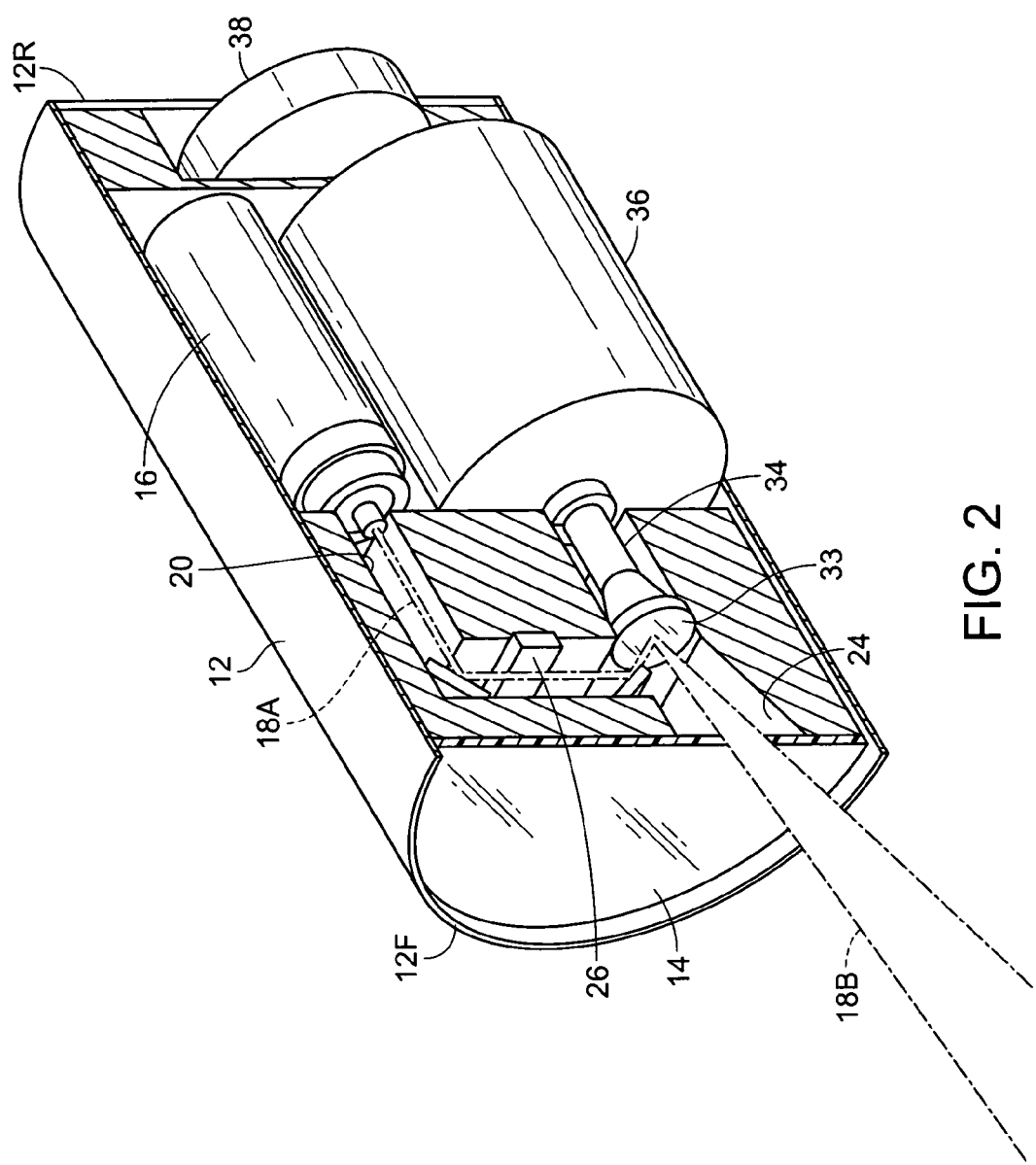
FIG. 2 is a diagrammatic perspective view, with parts broken away, illustrating the module of FIG. 1.
Figure 3:
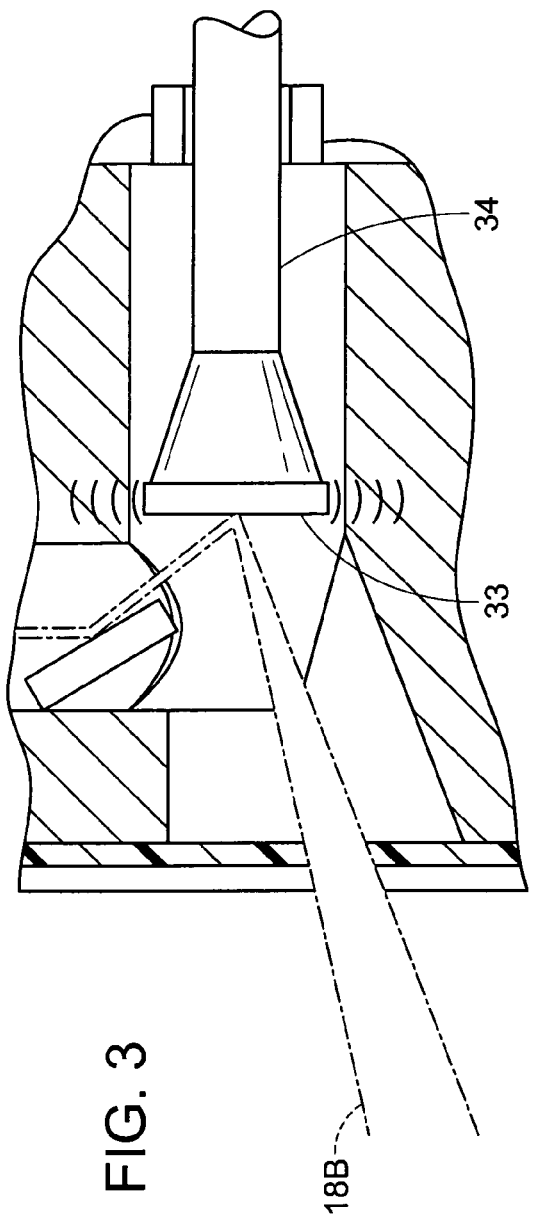
FIG. 3 is an enlarged view, showing the output mirror being rotated, and the beam directed thereagainst, so as to provide a wider dispersion pattern for the output beam.

FIGS. 1 and 2 illustrates a laser module 10, per se, which forms a portion of a laser illumination system of the present invention. The laser module 10 has an outer housing 12, having a front 12F and a rear 12R. A lens 14 is located at the front 12F. The lens is essentially transparent, and may be a planar—allowing light to pass therethrough without diffraction or diversion, or may be configured as partially or fully convex or concave to alter light traveling therethrough.

Within the housing 12, a beam emitter 16 is provided to produce an initial beam of laser light 18A, which is substantially monochromatic and coherent. The beam emitter 16 can be provided using a variety of different technologies, such as using gas filled tubes such as a HeNe (Helium-Neon) or CO2 (Carbon Dioxide) laser tube, lasing rods such as ruby-rod or YAG rods which produce laser light upon the absorbtion of adjacent flash discharge tubes, or can be diode based. Diode based lasers are typically less coherent (are somewhat divergent), and often require a lens to focus the beam. For the purposes of the present invention, however, which is to be incorporated in a vehicle where it may encounter extreme variations in temperature, as well as considerable shock and strain, a diode laser is preferred for the beam emitter 16.

Within the housing 12, a horizontal beam path 20 is a channel extending from the beam emitter 16 toward the front 12F, and a vertical beam path 22 is a channel extending from the horizontal beam path 20 downward, substantially parallel to the lens 14. Fully opposite from the horizontal beam path 20, the vertical beam path 22 ends at a forward opening 24 which connects the vertical beam path 22 with the lens 14 and provides sufficient room for dispersion of the beam thereat.

Accordingly, the initial beam of laser light 18A leaves the beam emitter 16 and travels horizontally and axially through the horizontal beam path 20 toward the front 12F. However, before reaching the front, the initial beam of laser light 18A is diverted by a first mirror 31, which is positioned and interposed substantially forty five degrees to both the horizontal beam path 20 and vertical beam path 22, so as to redirect the initial beam of laser light 18A axially and vertically downward within the vertical beam path 22.

A beam operation sensor 26 is generally located within the vertical beam path 20 such that it does not interfere with the initial beam of laser light 18A, but is capable of sensing the presence of the initial beam of laser light 18A, and thereby confirming the operation of the module 10 to provide feedback to a user regarding the same. Preferably, the beam operation sensor 26 is a very sensitive photocell which is well suited for detecting the wavelength emitted by the beam emitter 16 during normal operation thereof.

The initial beam of laser light is theoretically coherent, and the first mirror 31 is assumed to behave as a theoretically perfect mirror. If these components were indeed ideal, however, and the beam operation sensor 26 is not positioned to interrupt the initial beam of laser light 18A, then no light from the initial beam of laser light 18A would reach or be detected by the beam operation sensor 26 to confirm the presence of the initial beam of laser light 18A. In practice, however, the initial beam of laser light 18A, especially produced by a laser diode, is only substantially coherent. Also, some light will be dispersed in an omnidirectional fashion by imperfections of the first mirror 31, by any airborne particles within the horizontal and vertical beam paths 20 and 22, such that with sufficient sensitivity the beam operation sensor 26 will indeed receive enough light to positively indicate the presence of the intial beam of laser light 18A. However, if empirical experimentation reveals that these components function 'too ideally' to rely upon light reaching the beam operation sensor 26 to provide the desired feedback to the user, then a beam splitter or other optics can be employed at the first mirror 31 to redirect a portion of the initial beam of laser light 18A toward the beam operation sensor 26, as would be appreciated by those of ordinary skill in the art.

As the initial beam of laser light 18A is about to exit the vertical beam path 22, it encounters a second mirror 32 which redirects the initial beam of laser light 18A inward toward an output mirror 33, which extends substantially vertically and is located adjacent to both the forward opening 24 and the vertical beam path 22. The initial beam of laser light 18A reflects from the output mirror 33, and then may be referred to as an exiting beam 18B. The positioning of the second mirror 32 is such that it directs the initial beam of laser light 18A toward the output mirror 33 such that the exiting beam 18B travels through the lens 14 and is oriented somewhat downwardly. As illustrated, the exiting beam 18B is still substantially coherent, yet realistically diverges with increasing distance from the housing 12.

Figure 5:
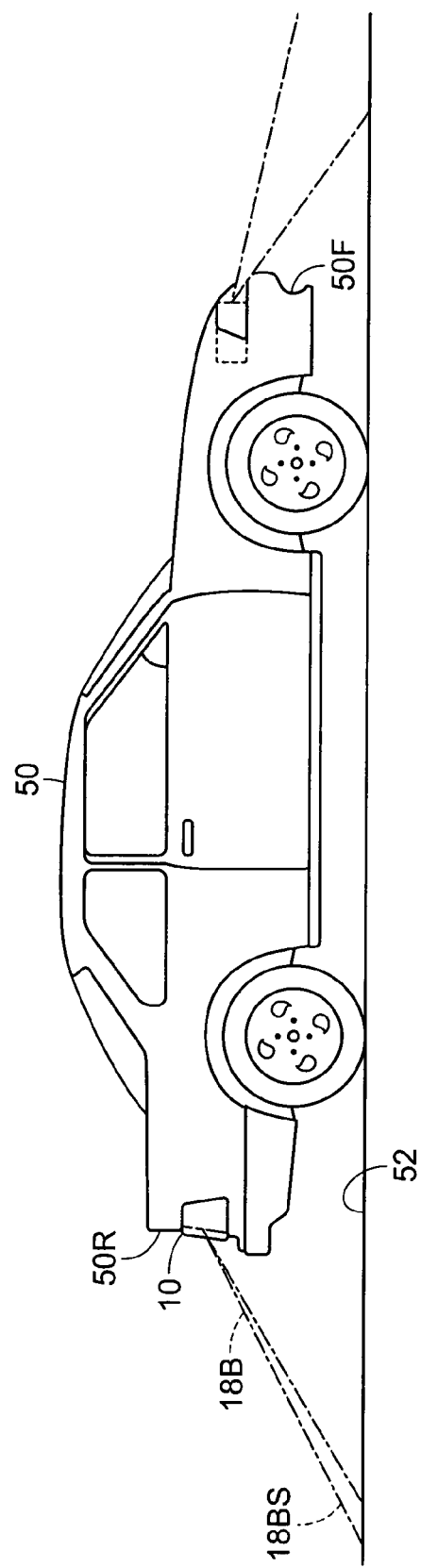
FIG. 5 is a side elevational view, illustrating one of the modules mounted in the rear of the vehicle, being used as a taillight.

Referring momentarily to FIG. 5, the module 10 is mounted within an automobile 50 having a front 50F and a rear 50R, which is traveling upon a ground surface 52. In particular the module 10 shown functioning is located at the rear 50R of the automobile 50, and is thereby being used as a taillight. Accordingly, the exiting beam 18B is projected rearwardly and downwardly therefrom so that it reaches the ground surface 52, where it forms a small cone 18BS of light thereupon. Because of the presence of airborne particles (especially during foggy conditions or precipitation), the exiting beam 18B will be visible to others, although it is still substantially coherent, and upon striking the ground surface 52, the small cone 18BS will be a bright spot on the ground surface 52 which follows directly behind the automobile 50 and thereby increases its visibility. Accordingly, the second mirror 32 is adjustable to selectively vary the angle of the exiting beam 18B and thereby vary the distance that it projects from the automobile 50, and the forward opening 24 is shaped to accommodate and not interfere with the reasonable range of the exiting beam 18B.

According to further embodiments of the invention, the module can function as a brake light as well as a taillight, whereas the system is linked to the brake pedal—like a conventional tail/brake light system—so that the exiting beam increases in intensity when the brake pedal is depressed. In addition, the system can be linked to a speed sensor in the automobile, so that the distance that the exiting beam 18B projects from the automobile 50 varies with the speed of the automobile. In its use as a taillight, therefore, the exiting beam 18B be steered to strike a spot on the pavement that the vehicle has passed perhaps two or three seconds earlier, so as to provide an 'invisible barrier', which warns others of a safe following distance, and notifies vehicles that when are traveling too closely behind automobile upon realizing that they are about to pass the small cone 18BS on the ground surface 52 or otherwise break the exiting beam 18B produced by the automobile 50 in front of them. This 'speed sensitive distance variation' can be easily accomplished by altering the angle of the second mirror 32 in response to the speed of the automobile 50.

Figure 4:
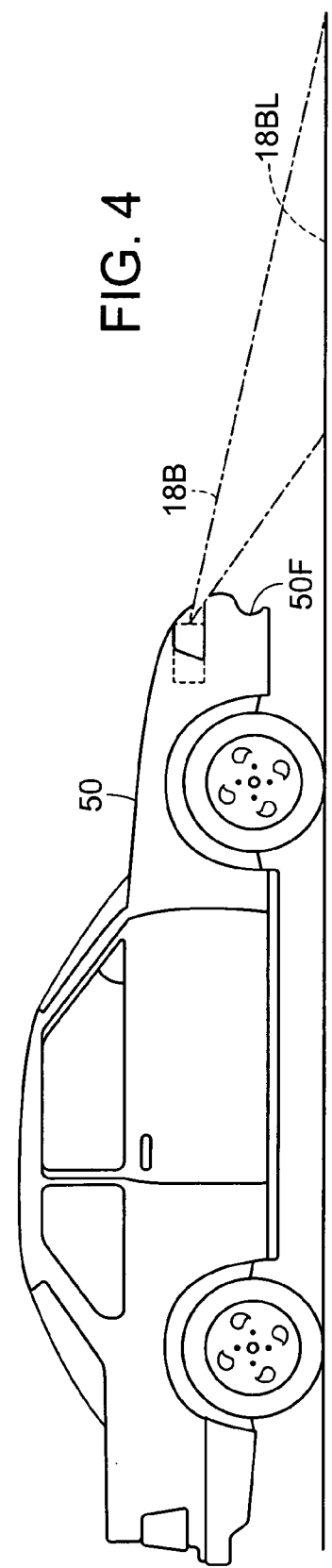
FIG. 4 is a side elevational view, illustrating one of the modules mounted in the front of the vehicle, being used as a headlight.

Referring to FIGS. 1 and 2, the module 10 is selectable between a headlight mode and a taillight mode, using a mode selector switch 28, located on the housing 12, generally at the rear 12R. Referring momentarily to FIG. 4, when mounted at the front 50F of the automobile 50 it is desirable for the module 10 to provide wider beam dispersion of the exiting beam, so that it produces a large cone 18BL upon the ground surface 52. Accordingly, when the module 10 is mounted at the front 50F of the automobile 50, the mode selector switch 28 is placed in the headlight mode.

To disperse the beam when in the headlight mode, the output mirror 33 is mounted on an output mirror shaft 34, which extends substantially perpendicular to the output mirror 33 and extends rearwardly therefrom. An output mirror motor 36 is operatively connected to the output mirror shaft 34 and is selectively capable of rotating said output mirror 33. When the mode selector switch 28 is in the headlight mode, the output mirror motor 33 will operate to rotate the output mirror 33 to create the large cone 18BL as the output mirror 33 is rotated.

Once again, in theory, if the output mirror is planar, the exiting beam 18B will reflect from the output mirror at an angle of reflection equal to whatever angle the initial beam of laser light 18A is incident upon said output mirror. Further, rotating the mirror by the output mirror shaft 34 should not affect the reflection of the exiting beam 18B—as the mirror rotates it simply changes the position on the mirror from which the initial beam of laser light 18A reflects. In reality, however, the output mirror 33 will wobble, either a little or a lot, depending on support of the output mirror shaft 34. As a result, the output mirror 33 will vary in angle with respect to the initial beam of laser light 18A as it rotates. Accordingly, such variance in angle of the output mirror 33 will trace a pattern larger than the exiting beam in the absence of rotation of the output mirror 33. The size of the pattern traced, and the size of the large cone 18BL generated upon the ground surface, can be controlled by varying the amount of wobbling of the output mirror shaft 34, or by otherwise rapidly controlling the angle of the output mirror 33, as would be appreciated by those skilled in the art. In addition, the use of an irregularly shaped mirror will allow the exiting beam 18B to trace a predetermined pattern with each rotation.

Figure 6:
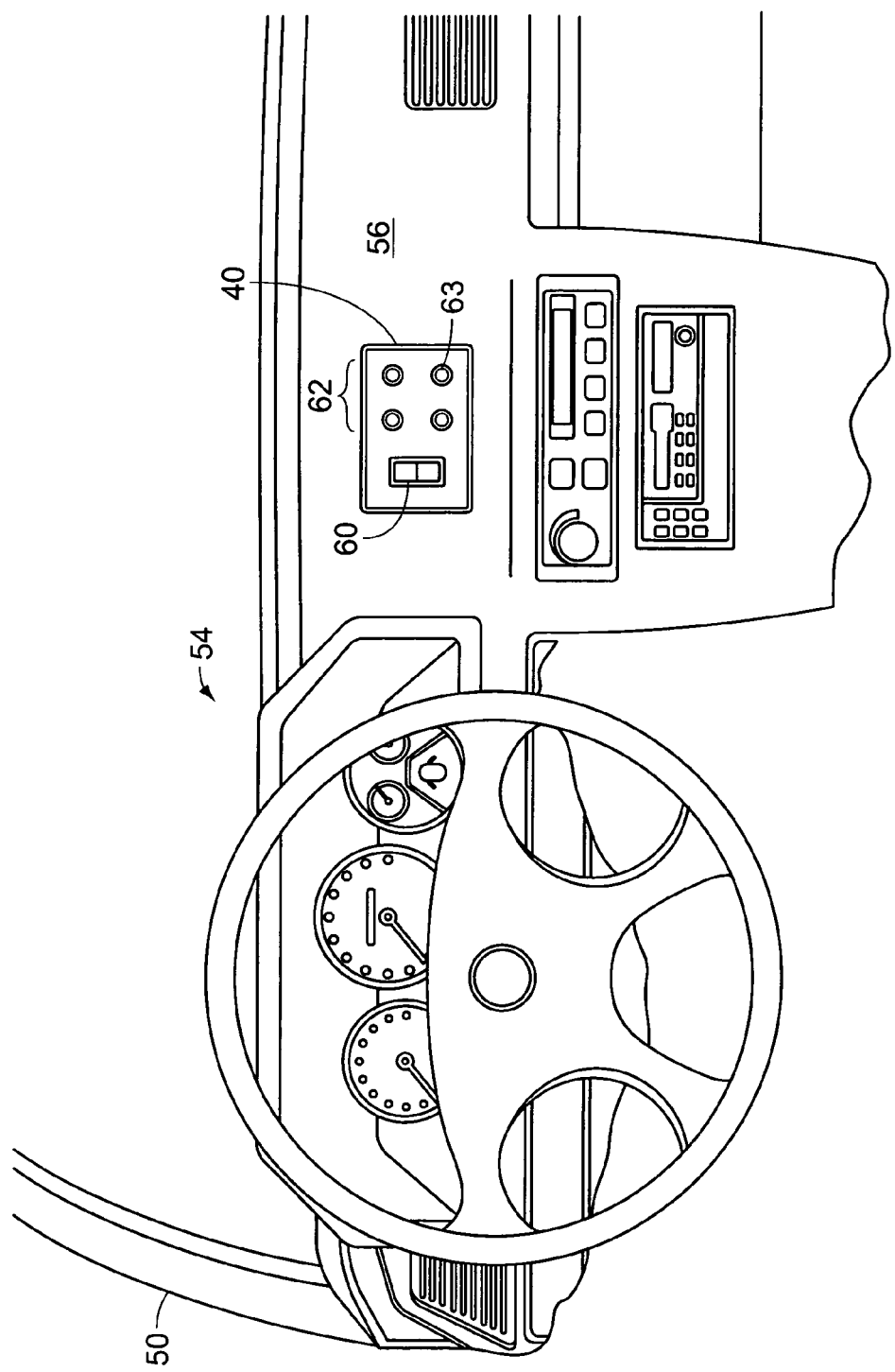
FIG. 6 is a front elevational view, illustrating an automotive dashboard, having the status panel mounted thereon, wherein the system is actuated, and the LEDS of the operation indicator bank are all illuminated to indicate that all beams are operational.

A control board 38 is located within the module to provide the functionality thus described, and is thereby connected to at least the mode selector switch 28, the beam operation sensor 26 and the output mirror motor 36, and the beam emitter 16. The control board 38 is preferably located adjacent the rear 12R of the housing 12 so as to be most accessible for diagnosis in the event of a module failure. In addition, as previously recited, preferably several modules 10 are provided as part of a laser illumination system within the automobile 50. Generally, in a typical automobile, four modules 10 are provided: two modules which are set to function as headlights and two modules which are set to function as taillights. Referring to FIG. 6, the automobile 50 has an interior 54 including a dashboard 56, and a status panel 40 is mounted thereupon. In general, the status panel 40 includes a main system switch 60 which selectively activates and deactivates the system, and an operation indicator bank 62 which includes one operation indication LED 63 associated with each module within the system to indicate that such module is functioning.

Figure 7B:
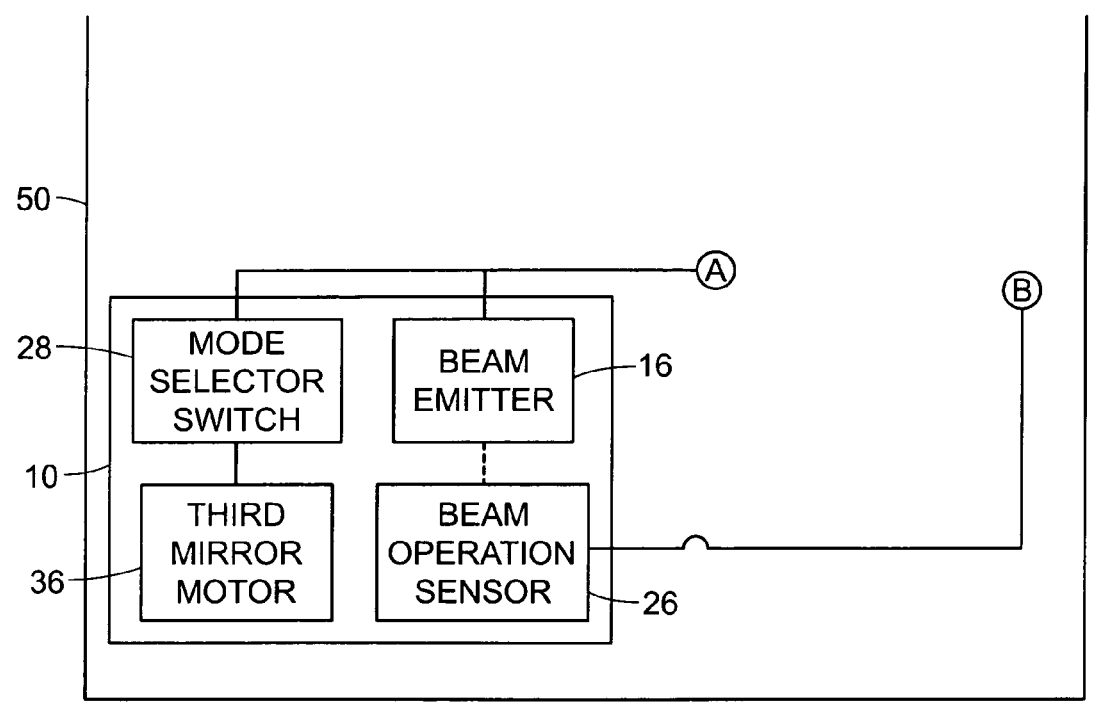
FIG. 7 is a functional block diagram, comprising FIG. 7A and FIG. 7B, illustrating four illumination modules, and illustrating their functional interconnection with the status panel.

Referring now to FIG. 7, the laser illumination system is functionally illustrated. In particular, four modules 10 are provided within the automobile 50. The status panel 40 is interconnected with the four modules 10, such that power is selectively supplied to the modules 10 upon activation of the system with the main system switch 60. In particular, power is supplied to the beam emitter 16 and mode selection switch 28, to activate the beam emitter 16 and selectively activate the output mirror motor 36 according to the position of the mode selection switch 28. In addition, the beam operation sensor 26 of each module communicates status of that module to the status panel 40 to selectively illuminate the operation indication LEDs within the operation indicator bank 62 when proper operation of the laser emitter 16 is detected thereby.

In conclusion, herein is presented a system which enhances the visibility of an automobile through the use of laser light and a plurality of modules which produces laser light, and output an exiting beam according to the selected useage of that module as a taillight or a headlight. The invention is illustrated by example in the attached drawing figures and in the foregoing description. Numerous variations, however, are possible while adhering to the inventive concept. Such variations is contemplated as being a part of the present invention.

What is claimed is:

1. A laser illumination system, for use with an automobile having a front and a rear and travels upon a ground surface, in enhancing the visibility of the automobile, comprising:
    at least one illumination module, the module having a housing having a front and rear, the module selectively mountable to the automobile at one of its front and rear, the module having a mode selection switch mounted on the housing for selecting between a headlight mode and a taillight mode, the module further having a lens at the front of the housing, a laser emitter which creates an initial beam of laser light, and an output mirror such that the initial beam of laser light is incident upon the output mirror which reflects the initial beam of laser light through the lens as an exit beam; and
    wherein the output mirror directs the exit beam through the lens outwardly and downwardly so that when mounted substantially horizontally in the automobile at the automobile rear the exit beam will strike the ground surface rearwardly of the automobile and create a small cone of light on said ground surface, and when mounted substantially horizontally in the automobile at the automobile front and the mode selection switch is in the headlight mode the exit beam will strike the ground surface forwardly of the automobile and create a large cone of light on said ground surface.

2. The laser illumination system as recited in claim 1, further comprising an output mirror motor and an output mirror shaft connected to the output mirror motor and extending rearwardly from the output mirror, and wherein the output mirror motor is activated when the mode selection switch is in the headlight mode.

3. The laser illumination system as recited in claim 2, wherein the automobile has a dashboard and wherein at least two modules are present, further comprising a status panel for mounting to the dashboard, the status panel having a main system switch for selectively powering the modules and an operation indicator bank having an operation indicator associated with each module, which each selectively illuminate to indicate whether its associated module is functioning.

4. The laser illumination system as recited in claim 3, wherein each module has a horizontal beam path, a vertical beam path extending downwardly and substantially perpendicularly from the horizontal beam path, and a first mirror interposed at a forty five degree angle to both the horizontal and vertical beam paths, so that the initial beam of laser light leaves the emitter and travels axially down the horizontal beam path, where it is reflected by the first mirror to travel axially down the vertical beam path.

5. The laser illumination system as recited in claim 4, wherein each module has a forward opening adjacent to the lens and to the vertical beam path fully opposite from the horizontal beam path, the output mirror is located adjacent to the vertical beam path and the forward opening, a second mirror is located within the vertical beam path and is angled to direct the initial beam of laser light toward the output mirror.

6. The laser illumination system as recited in claim 5, wherein for each module the angle of the second mirror with respect to the initial beam of laser light may be varied to vary the angle at which the initial beam of laser light strikes the output mirror, to thereby vary the angle of the exit beam, so that when said module is mounted substantially horizontally at one of the front and rear of the automobile, the second mirror can be used to control the distance from the automobile that the exit beam meets the ground surface thereebeneath.

7. The laser illumination system as recited in claim 6, comprising four modules, such that two of the mode selection switch of two of the modules are in the headlight position, and two of the modules are in the taillight position, such that two of the modules are mountable at the front of the automobile and two of the modules are mountable at the rear of the automobile.

8. The laser illumination system as recited in claim 1, wherein the module has a beam operation sensor within the housing for detecting the presence of light from the beam emitter and thereby indicating whether the module is functioning.

9. An automotive laser illumination system, comprising:
an automobile having a front and a rear, which travels upon a ground surface;
at least two illumination modules, each of the modules having a housing having a front and rear, one module mounted to the automobile at the front, and another module mounted to the automobile at the rear, each module having a mode selection switch mounted on the housing for selecting between a headlight mode and a taillight mode, the module further having a lens at the front of the housing, a laser emitter which creates an initial beam of laser light, and an output mirror such that the initial beam of laser light is incident upon the output mirror which reflects the initial beam of laser light through the lens as an exit beam; and wherein the output mirror directs the exit beam through the lens outwardly and downwardly so that the exit beam emerging from the module mounted at the automobile rear strikes the ground surface rearwardly of the automobile and create a small cone of light on said ground surface, and the mode selection switch of the module mounted at the automobile front is in the headlight mode so that the exit beam emerging from said module strikes the ground surface forwardly of the automobile and create a large cone of light on said ground surface.

10. The laser illumination system as recited in claim 9, wherein each module further comprises an output mirror motor and an output mirror shaft connected to the output mirror motor and extending rearwardly from the output mirror, and in response to the selection of the headlight mode the output mirror motor for the module located at the front of the automobile rotates the output mirror to create the large cone of the light forwardly thereof.

11. The laser illumination system as recited in claim 10, wherein each module has a beam operation sensor within the housing for detecting the presence of light from the beam emitter and thereby indicating whether the module is functioning.

12. The laser illumination system as recited in claim 11, wherein the automobile has a dashboard and wherein four modules mounted to the automobile, further comprising a status panel mounted to the dashboard, the status panel having a main system switch for selectively powering the modules and an operation indicator bank having an operation indicator associated with each module, which each operation indicator selectively illuminates to indicate whether its associated module is functioning.

13. The laser illumination system as recited in claim 12, wherein each module has a horizontal beam path, a vertical beam path extending downwardly and substantially perpendicularly from the horizontal beam path, and a first mirror interposed at a substantially forty-five degree angle to both the horizontal and vertical beam paths, so that the initial beam of laser light leaves the emitter and travels axially down the horizontal beam path, where it is reflected by the first mirror to travel axially down the vertical beam path.

14. The laser illumination system as recited in claim 13, wherein each module has a forward opening adjacent to the lens and to the vertical beam path fully opposite from the horizontal beam path, the output mirror is located adjacent to the vertical beam path and the forward opening, a second mirror is located within the vertical beam path and is angled to direct the initial beam of laser light toward the output mirror.

15. The laser illumination system as recited in claim 14, wherein for each module the angle of the second mirror with respect to the initial beam of laser light may be varied to vary the angle at which the initial beam of laser light strikes the output mirror, to thereby vary the angle of the exit beam, so that the second mirror can be used to control a distance forwardly or rearwardly of the automobile at which the exit beam meets the ground surface therebeneath.

16. A laser illumination method, for enhancing the visibility of an vehicle having a front and a rear, using at least two modules, each module having a laser emitter and an exit beam of laser light, each module has an output mirror which directs the exit beam and an output motor for selectively rotating the output mirror, each module is selectable between a headlight mode and a taillight mode, one of said modules mounted at the front of the vehicle, and one of said modules mounted at the rear of the vehicle, comprising the steps of:
- selecting the headlight mode on the module located at the front of the vehicle;
- driving the vehicle upon a surface;
- making a small cone of light on the surface behind the vehicle by projecting the exit beam from the module located at the rear of the vehicle rearwardly and downwardly from the vehicle so that the exit beam strikes said surface rearwardly of the vehicle; and
- creating a large cone of light on the surface in front of the vehicle by rotating the output mirror and projecting the exit beam from the module located at the front of the vehicle forwardly and downwardly from the vehicle so that the exit beam strikes said surface forwardly of the vehicle.

17. The laser illumination method as recited in claim 16, wherein the module has a housing having a front having a lens through which the exit beam projects and a rear having a mode selection switch for selecting between a headlight mode and a tail light mode; and wherein the module mounted at the front of the vehicle has the mode selection switch set in the headlight mode, and the module mounted at the rear of the vehicle has the mode selection switch set in the taillight mode.

\* \* \* \* \*